March 13, 1934.                P. F. FIENE                1,951,238
KITCHEN CABINET
Filed Aug. 4, 1933            2 Sheets-Sheet 1
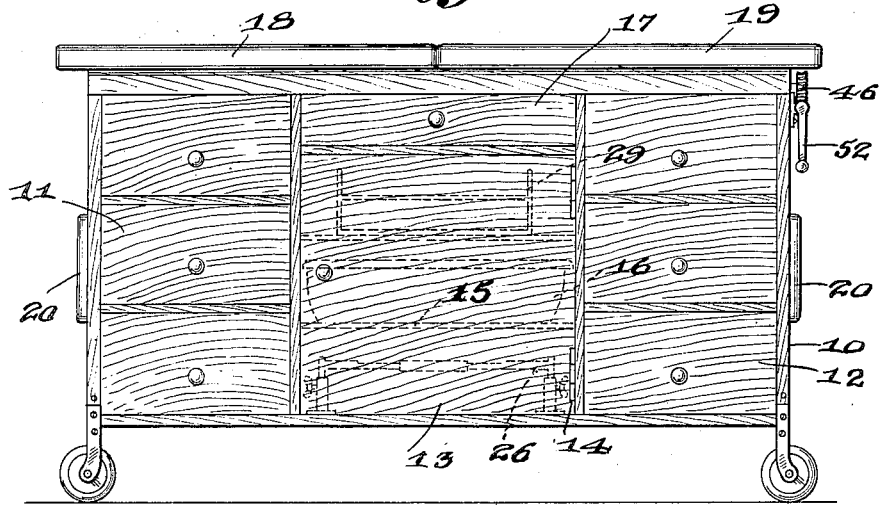
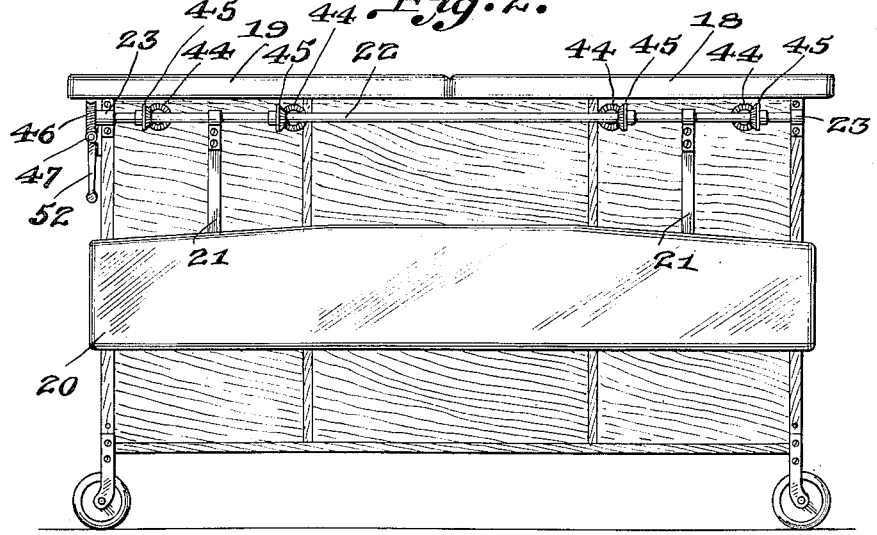
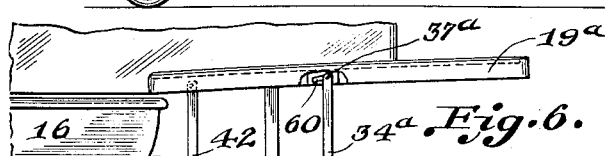
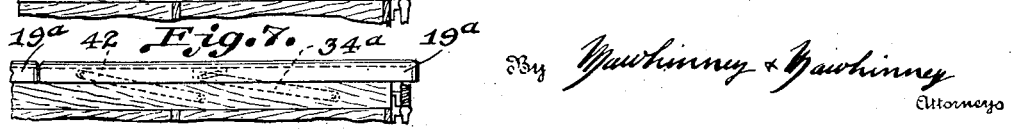
Inventor
P. F. Fiene
By Mawhinney & Mawhinney
Attorneys

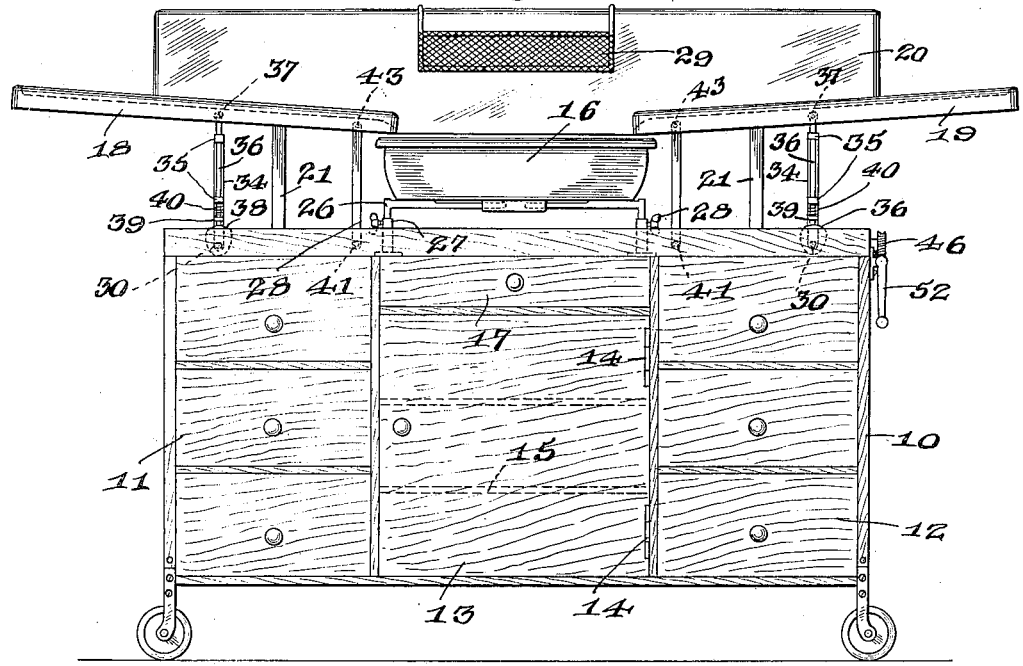
March 13, 1934.   P. F. FIENE   1,951,238
KITCHEN CABINET
Filed Aug. 4, 1933   2 Sheets-Sheet 2

Patented Mar. 13, 1934

1,951,238

UNITED STATES PATENT OFFICE 1,951,238

KITCHEN CABINET

Paul F. Fiene, Charter Oak, Iowa

Application August 4, 1933, Serial No. 683,661

6 Claims. (Cl. 141—9)

The present invention relates to improvements in kitchen cabinets and constitutes certain improvements over the device illustrated and described in my prior co-pending similarly entitled application, Serial No. 641,627, filed November 7, 1932.

In common with the objects of that prior application the present improvement aims to provide an improved kitchen cabinet which may be wheeled about from place to place, for instance, from the kitchen to the dining room and back for the purpose of receiving the dishes and enabling the expeditious washing and drying of the same.

A further object of the invention resides in providing certain mechanical means for raising and lowering the drain and splash boards and for acting to hold same in the elevated position.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a front elevation of an improved kitchen cabinet constructed in accordance with the present invention and with the parts shown in the collapsed position.

Figure 2 is a rear elevation of the same.

Figure 3 is a front elevation similar to Figure 1, but with the parts raised in position of use.

Figure 4 is a top plan view of the cabinet with the drain boards removed.

Figure 5 is a fragmentary end view showing the mechanical operating device.

Figure 6 is a fragmentary front elevation showing a modification with the drain board in raised position, and Figure 7 is a similar view with the same collapsed.

Referring more particularly to the drawings, the cabinet body is designated generally at 10, having tiers of drawers 11 and 12 in which various utensils useful about a kitchen may be kept. The center portion of the cabinet may be provided with a door 13 hinged, as indicated at 14, and giving access to interior compartments which contain adjustable shelves 15 for receiving a dish pan 16, its adjustable support, wire racks, etc. Above this cupboard space is a central drawer 17 for containing forks, knives, etc.

At 18 and 19 are shown drain boards and at 20 a splash board. The splash board is held upon arms 21, shown in Figure 2, to be secured upon a shaft 22 which is journalled in appropriate bearings 23 affixed to the rear wall of the cabinet near its upper portion.

As shown in Figure 3, the drain boards incline downwardly toward the basin 16, which basin is supported in an elevated position by an appropriate supporting rack or cradle 26 provided with telescoping feet 27 for adjustment, the adjustment being preserved by set screws 28.

The splash board 20 may carry a wire rack 29 adapted to hang or clamp over the top of the splash board above the dish pan. This wire rack is adapted to contain the unwashed forks, knives, spoons, etc.

The drain boards 18 and 19 are held in an inclined position when raised by means of the collapsible frames beneath same.

These collapsible frames are more particularly shown in Figures 3 and 4. Each drain board virtually has two such frames. The outer frame is composed of a shaft 30 journalled in the flanges 31 and 32 of the cabinet which rise above the depressed upper cabinet surface 33. Thus there is provided at the top of the cabinet this space in which to receive the frames when folded downwardly or collapsed, whereby the drain boards 18 and 19 are allowed to rest upon the flanges or moldings 31 and 32 of the cabinet. This collapsed position of the parts is shown in Figures 1 and 2 and the frames which support the drain boards are completely concealed in this condition. The shaft 30 carries arms 34 affixed thereto and turning with the shaft 30. The arms are provided with eyes 35 to slidably receive rods 36, the outer ends of which are pivoted to the undersides of the drain boards as indicated at 37. The inner ends of the rods 36 engage upon cams 38 affixed to the cabinet. In other words, the cams 38 are non-rotatable or stationary, while the shaft 30 together with the arms 34 and rods 36 are rotatable. Collars 39 are affixed to the rods 36 near their inner ends to form abutments against which coil springs 40 abut at their inner ends. The outer ends of the springs 40 abut against the lower eyes 35.

The inner frames are made up of rotary shafts 41 journalled cross-wise in the flanges or moldings 31 and 32 of the cabinet and carrying arms 42 which are affixed thereto and which are pivoted to the drain boards as indicated at 43.

The shafts 30 and 41, which shafts are four in number, extend through the rear flange or molding 31 and carry beveled pinions 44 meshing with companion bevel pinions 45 which are fixed upon the rear shafts 22 which carries the arms 21 and the splash board 20.

This shaft is intended to be driven from a central point by a single operating means shown more particularly in Figures 4 and 5. To this end the shaft 22 is provided with a worm wheel 46 disposed in mesh with a worm 47 upon a tubular stud 48 mounted in a bearing 49 at one side of the cabinet. Playing loosely back and forth in an axial direction in the tubular stud 48 is an end of an operating shaft 50 supported in part by the stud and in part by a bearing 51 attached to the side of the cabinet at its forward part. The shaft 50 is slidable axially in the bearing 51 and carries a crank handle 52 by which rotary movement may be communicated to said shaft 50.

On the shaft 50 is a cone or other clutch 53 adapted to take into a companion conical bearing or socket 54 affixed to the side wall of the cabinet.

The shaft 50 also carries a ball or a sphere 55 adapted to occupy either of the spring pockets 56 carried by the side wall of the cabinet.

In operation the parts are normally in the position shown in Figures 1 and 2 in which the drain boards 18 and 19 are in the lowered position upon the top of the cabinet, and the splash board 20 is in a rear position depending at the back of the cabinet.

In order to raise the drain boards 18 and 19 and the splash board 20 to the elevated position shown in Figure 3, the crank handle 52 is pulled outwardly and rotated. It will be understood that the bore of the hollow stud 48 and the end of the shaft 50 which occupies such bore are square or polygonal in cross-section so that when the crank 52 is rotated, rotary movement will be communicated from the shaft 50 to the stud 48 and thence to the worm 47 and worm wheel 46 by which the shaft 22 is rotated.

Upon rotation of the shaft 22 the arms 21 will be swung up thus elevating the splash board 20, the movement being through 180° to cause the splash board to stand upright at the back of the cabinet.

At the same time the pinions 45 and 44 are being rotated to cause corresponding rotation of the shafts 30 and 41. These shafts will elevate the arms 34 and 42.

As the arms 34 are raised, the inner ends of the rods 36 wipe over the cam surfaces 38, the highest points of such cam surfaces being at the uppermost portions thereof so that as such arms 34 are rotated through an arc of 90° the rods 36 are forced outwardly upon the arms 34 thus causing the outer portions of the drain boards to be elevated with reference to the inner portions thereof. In other words, the drain boards 18 and 19 are thereby made to assume an inclination sloping down toward the basin 16 which is placed beneath and between the drain boards and upon its rack after the parts have been elevated.

The gear ratio will be such that as the shaft 22 is turned through 180° to elevate the splash board the shafts 30 and 41 will only be moved through an arc of 90° in order to elevate same to the vertical position. The arrangement of gearing is such also that the drain board frames at both sides will fold down inwardly toward the center of the cabinet.

After the drain boards have been elevated, the shaft 50 is pushed inwardly, as shown at dotted lines in Figure 5, thus causing the cone 53 to engage the cone socket 54 and thereby establish a clutch lock which will prevent rotation of any of the parts such as might permit the casual or accidental descent of the drain boards and the splash board. The ball 55 will occupy the one or the other spring pocket 56 accordingly as the shaft 50 is in the "in" or "out" position. This ball and pocket arrangement will permit free rotation of the shaft and the ball will snap into the pocket as force is applied to shift the shaft in either direction. When the shaft is in the outer position, the ball and socket will permit of the free rotation of the shaft but will prevent any further outward movement of the shaft such as might cause disengagement between the shaft 50 and the stud 48.

The drain boards 18 and 19 are supplied with a flange around the outer edges which serves to keep dishes, utensils, etc., from sliding off the drain boards while moving the cabinet about; and this flange will also require any water that may be spilled on the drain boards to drain toward the dish pan 16. The flange around the drain boards will also promote the usefulness of the cabinet when the drain boards are folded down as a service cart.

Referring more particularly to Figure 6, the drain board 19ᵃ is shown as provided with slots 60 in which the pins 37ᵃ of the arms 34ᵃ play loosely. In this case the arms 34ᵃ are of fixed length and are slightly longer than the arms 42 whereby to raise the outer portion of the drain board 19ᵃ for the purpose of inclining the same down toward the dish pan 16. The slots 60 afford sufficient play so that the upper ends of the arms 34ᵃ may slide forward as the boards are folded down, and when raising the boards the backward swing of the arms 34ᵃ causes the pins 37ᵃ to slide back in the slots 60 raising the board in a rigid manner.

It will be obvious that various changes might be made in the construction, combination and arrangement of parts, which could be used without departing from the spirit of my invention, and I do not mean to limit the invention to such details, except as particularly pointed out in the claims.

Having thus described my invention, what I claim and desire to secure by Letters Patent of the United States is:—

1. In a kitchen cabinet, a supporting structure, drain boards, frames pivoted to said supporting structure and to the drain boards and adapted to fold down and to swing up, certain of said frames having means associated therewith for raising the outer portions of the drain boards when elevated, and means to raise and lower said frames.

2. In a kitchen cabinet, a supporting structure, drain boards, inner frames pivoted to the supporting structure and to the drain boards, outer frames including arms pivoted to the supporting structure, rods slidably connected to said arms and pivoted to the drain boards, and means for moving said rods upwardly with respect to said arms when the outer frames are raised.

3. In a kitchen cabinet, a supporting structure, drain boards, inner frames for the drain boards pivoted to the supporting structure and to said drain boards, outer frames pivoted to the cabinet and having eyes thereon, rods slidably mounted in said eyes and pivoted to said drain boards, spring means for urging said rods inwardly, and cams for engaging said rods to move same outwardly when elevated.

4. In a kitchen cabinet, a supporting structure, a shaft journalled at the back of the supporting structure, a splash board, arms connecting said splash board with the shaft, drain boards, frames pivoted to the supporting structure and to the drain boards, said frames including shafts, gear means between said frame shafts and the first mentioned shaft, and means for rotating said first mentioned shaft in either direction.

5. In a kitchen cabinet, a supporting structure, movably mounted drain boards, a movably mounted splash board, a shaft operatively connected to said drain and splash boards, a hollow stud geared to said shaft, an operating shaft axially movable with respect to said stud and having an end projecting slidably in and in driving relation to said stud, means to rotate said operating shaft, and a clutch lock engaged by said operating shaft when in one position and disengaged in another position of the shaft.

6. In a kitchen cabinet, a supporting structure, movably mounted drain and splash boards, a shaft operatively connected to said boards for raising and lowering said boards, a hollow stud geared to said shaft, an operating shaft journalled on the supporting structure for axial shifting movement and having an end disposed in, and in driving relation with, said stud, a cone carried by said operating shaft, a cone socket carried by the supporting structure for receiving said cone when the operating shaft is moved axially in one direction, a ball carried by said operating shaft, and a pair of axially displaced spring sockets on the supporting structure for receiving said ball in either the "in" or "out" position of the operating shaft.

PAUL F. FIENE.